United States Patent [19]
Lungu

[11] Patent Number: 5,098,062
[45] Date of Patent: Mar. 24, 1992

[54] MAGNETIC VALVE INCORPORATING A PERMANENT MAGNET FOR EFFECTING VALVE CLOSURE

[75] Inventor: Cornelius Lungu, Bühlertal, Fed. Rep. of Germany

[73] Assignee: Melitta-Werke Bentz & Sohn, Minden, Fed. Rep. of Germany

[21] Appl. No.: 473,939

[22] PCT Filed: Apr. 22, 1989

[86] PCT No.: PCT/DE89/00253
§ 371 Date: Feb. 27, 1990
§ 102(e) Date: Feb. 27, 1990

[87] PCT Pub. No.: WO89/10511
PCT Pub. Date: Nov. 2, 1989

[30] Foreign Application Priority Data
Apr. 28, 1988 [DE] Fed. Rep. of Germany ....... 3814359

[51] Int. Cl.⁵ .................. F16K 31/08; F16K 31/02
[52] U.S. Cl. .................. 251/65; 251/129.2; 335/179; 335/253
[58] Field of Search ........ 251/65, 129.2, 58, 213, 251/214; 335/170, 177, 253, 179

[56] References Cited

U.S. PATENT DOCUMENTS

| | | | |
|---|---|---|---|
| 2,349,443 | 5/1944 | McCarty | 335/253 X |
| 2,850,258 | 9/1958 | Lazich | 251/65 X |
| 2,947,319 | 8/1960 | Kaldobsky | 251/65 X |
| 3,089,931 | 5/1963 | Cunningham | 335/170 X |
| 3,481,578 | 12/1969 | Baldi | 251/65 |
| 4,561,632 | 12/1985 | Hügler | 251/129.2 X |

FOREIGN PATENT DOCUMENTS

| | | |
|---|---|---|
| 3312354 | 10/1984 | Fed. Rep. of Germany . |
| 3423469 | 1/1986 | Fed. Rep. of Germany . |
| A064757 | 12/1955 | France .............. 251/129.2 X |

*Primary Examiner*—Martin P. Schwadron
*Assistant Examiner*—Kevin L. Lee
*Attorney, Agent, or Firm*—Spencer & Frank

[57] ABSTRACT

A magnetic valve which is closed when current is absent includes an electromagnet driver having a U-shaped magnetizable yoke carrying a winding; a pivotally attached armature including a soft magnetic material; a permanent magnet disposed on the armature; and a pole plate disposed between the permanent magnet and a part of the yoke which carries the winding. The yoke part and the pole plate define a separating plane therebetween. The mangetic valve further has a valve cone disposed on the armature below the separating plane.

7 Claims, 1 Drawing Sheet

MAGNETIC VALVE INCORPORATING A PERMANENT MAGNET FOR EFFECTING VALVE CLOSURE

BACKGROUND OF THE INVENTION

The invention relates to a magnetic valve which is closed in the currentless state, with the closing and sealing force being generated with the aid of a permanent magnet.

Various, usually complicated magnetic valve structures in which the valve closing force is generated by means of permanent magnets are known in the art.

In view of the sensitivity of electrical windings to liquids or gases, the coil chamber of magnetic valves must be sealed against the area to be blocked in which the movable armature is disposed. Due to air gaps which increase in size, this usually leads to solutions requiring increased electrical power or being expensive.

SUMMARY OF THE INVENTION

The magnetic valve according to the invention is intended to open the discharge opening of a liquid container, for example in a household appliance, with the least possible current when excited and to close it again in the currentless state. The pressure differences to which the valve is subjected are slight and it is necessary to protect the winding against liquid vapors, deposits, etc.

It is therefore an object of the present invention to propose a simple and economical structural solution which optimally accomplishes the task at hand.

DESCRIPTION OF THE PREFERRED EMBODIMENT

Figure 1:
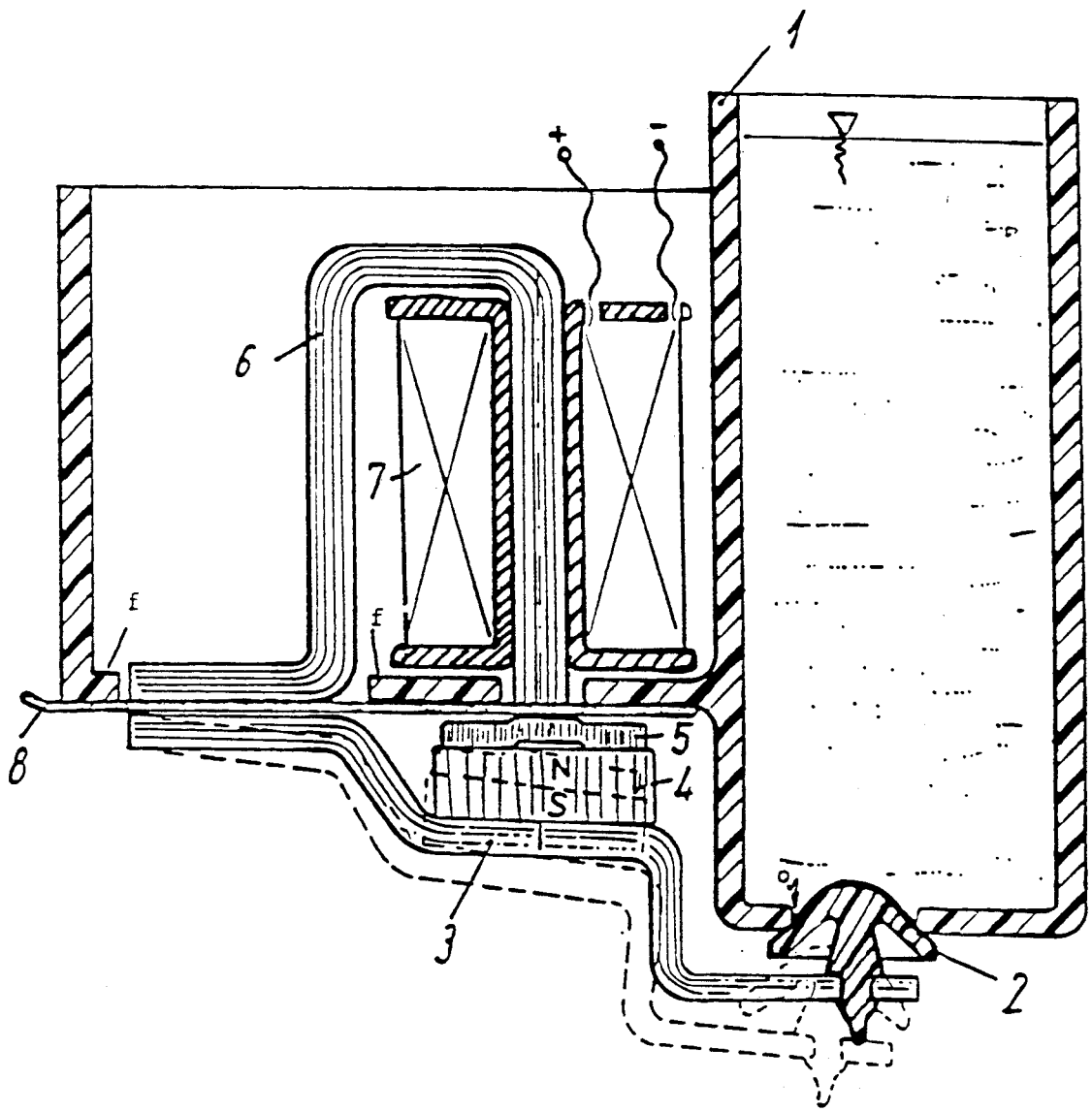
FIG. 1 depicts a preferred embodiment of the invention.

A liquid container 1 made, for example, of plastic has an opening 0 in its lower region held closed by a valve cone 2 made, for example, of rubber. This cone is disposed on a movable armature 3 produced of a magnetic material, possibly having corrosion inhibiting characteristics, e.g. of stainless steel. Armature 3 is provided with a permanent magnet 4 (e.g. of ferrite) which is equipped with a pole plate 5 that positively bundles the magnetic field lines from magnet 4.

Armature 3, including valve cone 2, magnet 4 and pole plate 5, is rotatable about its left extremity and is otherwise mounted, by way of stops (not shown), so that, in the open valve position, it takes on the position shown in dashed lines. In this position, the opening o of container 1 is exposed so that its contents are able to flow out. Armature 3 is provided with a bend between the plane of the valve cone and the plane of the magnet, so that the permanent magnet lies higher than opening o. The reason for this design is to prevent the outflowing liquid from wetting permanent magnet 4 and its pole plate 5 which could produce larger quantities of deposits that would interfere with the proper functioning of the valve.

Armature 3 is driven by interaction with an electromagnet composed of a magnetic yoke 6 equipped with a coil 7.

The chamber for the electromagnet is separated from the armature chamber by a thin sheet 8. The latter prevents liquid vapors or drops from penetrating into the coil chamber and thus produce corrosion phenomena or leakage currents at the electrical components. The separating sheet 8 may be composed, for example, of an adhesive tape that is glued over a correspondingly shaped extension f of container 1. Structurally, care must be taken that the ends of magnetic yoke 6 lie in the same plane with extension f of container 1 so that adhesive sheet 8 is in good contact. The thickness of adhesive sheet 8, which is only a few one-hundredth of a millimeter, ensures that no larger air gap and thus no large magnetic losses can be created between pole plate 5 or armature 3 and yoke 6. If greater magnetic losses are acceptable, it is also possible to omit separating sheet 8 and instead configure extension f of container 1 as a thin partition between armature 3 and magnetic yoke 6.

With the appropriate excitation of coil 7, magnetic repelling forces are generated at the interface between yoke 6 and pole plate 5; that is, the extremity of yoke 6 will have the same polarity as pole plate 5. In the case where coil 7 is without current, attraction forces are generated between magnetic yoke 6 and pole plate 5 to close the valve. The magnetic forces acting between magnetic yoke 6 and pole plate 5 increase with decreasing air gap so that the sealing force is at a maximum when the valve is in its closed state, which enhances its reliable operation. The magnetic circuit is closed by way of the horizontal end of yoke 6 which extends parallel to part of armature 3. These parts face one another with a relatively large surface area so that magnetic losses at this point are minimal.

The configuration of the magnetic valve further makes it possible to manually actuate armature 3 by external action if necessary.

The magnetic valve has the advantages of a polarized embodiment, i.e. high energy efficiency, and its structural design is particularly simple, similarly to that of a folding armature magnetic circuit.

A closing spring, which would be difficult to install in a miniaturized embodiment and might be subject to corrosion, is not required.

I claim:

1. A magnetic valve which is closed when current is absent, comprising:
   an electromagnet driving means including a U-shaped magnetizable yoke having a winding on a part of said yoke;
   a pivotally attached armature including a soft magnetic material;
   a permanent magnet disposed on said armature;
   a pole plate disposed between said permanent magnet and the part of said yoke having said winding thereon;
   said part of the yoke and said pole plate defining a separating plane therebetween; and
   a valve cone disposed on said armature below said separating plane.

2. A magnetic valve as defined in claim 1, further comprising means defining a valve seat in said armature; said valve cone comprises an elastomer, and said valve cone includes a base having sufficient elasticity for being disposed in said valve seat.

3. A magnetic valve as defined in claim 1, wherein said valve cone is elastic and is mushroom shaped.

4. A liquid container having an opening and a magnetic valve for closing said opening when current is absent, comprising:

a plastic housing;

an electromagnet driving means including a U-shaped magnetizable yoke having a winding on a part of said yoke;

an armature pivotally attached to said housing, said armature being a soft magnetic material;

a permanent magnet disposed on said armature;

a pole plate disposed between said permanent magnet and the part of said yoke having said winding thereon;

said permanent magnetic and said pole plate having two magnetic poles oriented toward said part of said yoke; said part of the yoke and said pole plate having a substantially planar separating face therebetween; and a valve cone disposed on said armature for closing said opening.

5. A magnetic valve as defined in claim 4, further comprising a thin sheet disposed on said housing between said pole plate and said part of said yoke.

6. A magnetic valve as defined in claim 5, wherein said sheet is self-adhesive.

7. A magnetic valve as defined in claim 4, wherein each one of said armature and said pole plate comprises a soft magnetic steel having corrosion inhibiting characteristics.

* * * * *